United States Patent
Lee

(10) Patent No.: US 9,991,050 B2
(45) Date of Patent: Jun. 5, 2018

(54) WIRE WINDING DEVICE FOR STATOR

(71) Applicant: Ming-Chang Lee, Taipei (TW)

(72) Inventor: Ming-Chang Lee, Taipei (TW)

(*) Notice: Subject to any disclaimer, the term of this patent is extended or adjusted under 35 U.S.C. 154(b) by 295 days.

(21) Appl. No.: 15/063,524

(22) Filed: Mar. 8, 2016

(65) Prior Publication Data

US 2017/0263381 A1    Sep. 14, 2017

(51) Int. Cl.
*H01F 41/088* (2016.01)
*H02K 15/085* (2006.01)
*H02K 15/095* (2006.01)

(52) U.S. Cl.
CPC ......... *H01F 41/088* (2016.01); *H02K 15/085* (2013.01); *H02K 15/095* (2013.01)

(58) Field of Classification Search
CPC ... H01F 41/088; H02K 15/085; H02K 15/095
See application file for complete search history.

(56) References Cited

U.S. PATENT DOCUMENTS

| | | | | |
|---|---|---|---|---|
| 4,617,972 A | * | 10/1986 | Walker ................. | H02K 15/068 140/92.1 |
| RE34,817 E | * | 1/1995 | Luciani ................. | H02K 15/095 242/432.6 |
| 6,267,317 B1 | * | 7/2001 | Beakes ................. | H02K 15/095 242/432.4 |
| 2002/0017585 A1 | * | 2/2002 | Haruta ................. | H02K 15/095 242/433.3 |
| 2005/0006519 A1 | * | 1/2005 | Becherucci .......... | H02K 15/095 242/433.1 |
| 2005/0061906 A1 | * | 3/2005 | Burch ................. | H02K 15/085 242/432 |

* cited by examiner

*Primary Examiner* — Emmanuel M Marcelo

(57) ABSTRACT

A wire winding device for a stator contains: a rotatable tray, a horizontal shaft, a support post, and a guiding bar. The rotatable tray includes a clamping portion, a fixing portion, an accommodation orifice, and a slot. The horizontal shaft includes a connection section located on a first end thereof and includes a clamp arm arranged on a second end thereof proximate to a receiving trough. The support post inserts into the receiving trough of the horizontal shaft and is clamped by the clamp arm, and the support post includes two jaws and a circular cavity defined therein adjacent to the two jaws. The guiding bar includes a part housed in the circular cavity and is hollow so as to accommodate a metal wire which is located in or around a stator.

4 Claims, 8 Drawing Sheets

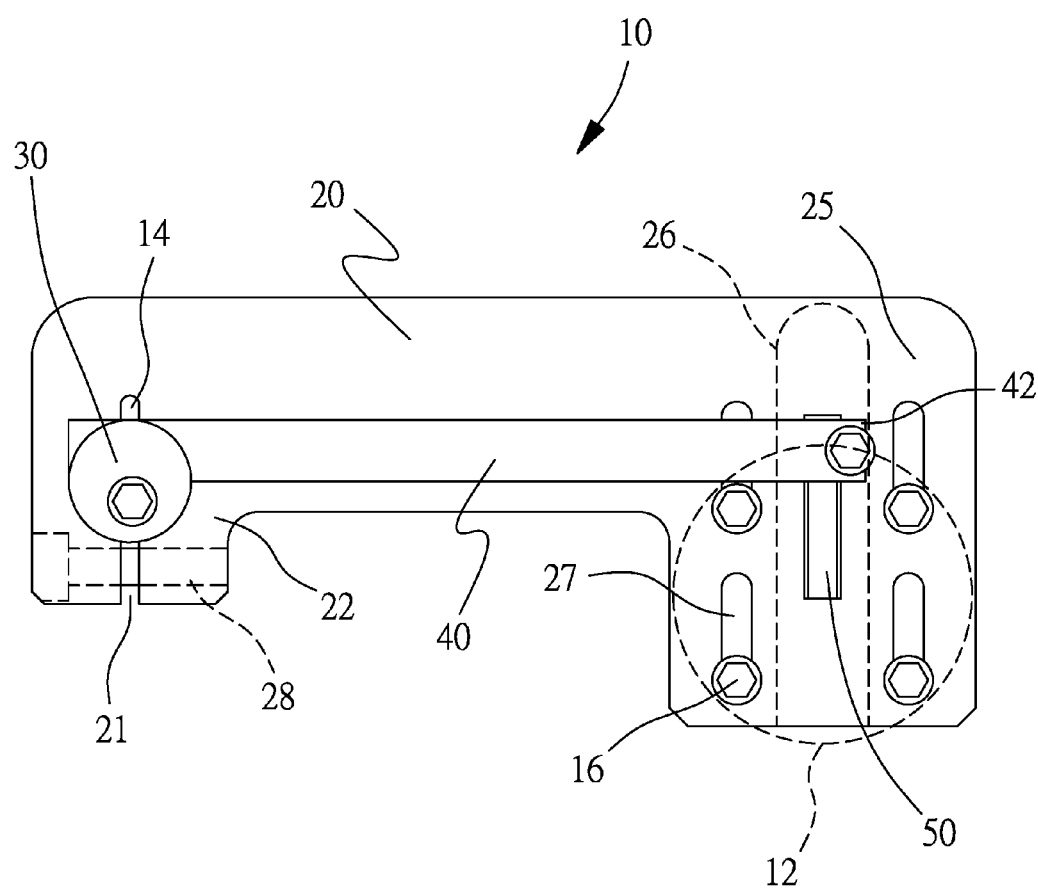
F I G. 1

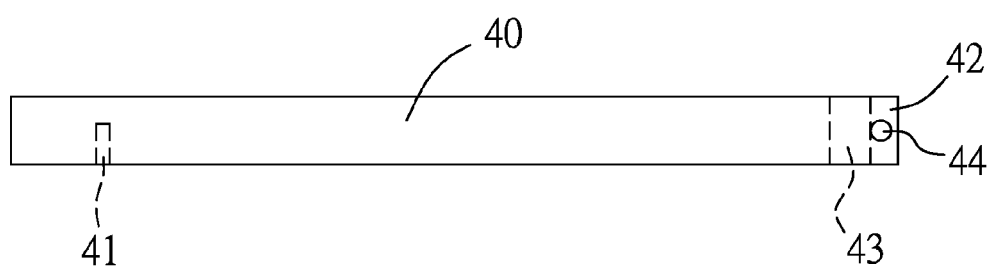
F I G. 6

WIRE WINDING DEVICE FOR STATOR

FIELD OF THE INVENTION

The present invention relates to a wire winding device which winds wire into a stator of small size easily and securely.

BACKGROUND OF THE INVENTION

A conventional wire winding device for a stator is employed to wind wire in the stator of fixed size, thus limiting using range of the wire winding device. Furthermore, the conventional wire winding device cannot wind the wire in a stator of small size.

The present invention has arisen to mitigate and/or obviate the afore-described disadvantages.

SUMMARY OF THE INVENTION

The primary objective of the present invention is to provide a wire winding device which winds wire into a stator of small size easily and securely.

To obtain above-mentioned objective, a wire winding device provided by the present invention contains: a rotatable tray, a horizontal shaft, a support post, and a guiding bar.

The rotatable tray includes a clamping portion arranged on a top thereof, a fixing portion arranged on a bottom thereof, an accommodation orifice defined on a central position of the clamping portion, and a slot extending from the accommodation orifice to a peripheral side of the rotatable tray.

The horizontal shaft includes a connection section located on a first end of the horizontal shaft and inserting into the accommodation orifice of the clamping portion, and the horizontal shaft also includes a clamp arm arranged on a second end of the horizontal shaft proximate to a receiving trough.

The support post inserts into the receiving trough of the horizontal shaft and is clamped by the clamp arm, and the support post includes two jaws one piece formed with a first end thereof and includes a circular cavity defined therein adjacent to the two jaws.

The guiding bar includes a part housed in the circular cavity and is hollow so as to accommodate a metal wire which is located in or around a stator.

BRIEF DESCRIPTION OF THE DRAWINGS

FIG. 1 is a side plan view showing the assembly of a wire winding device for a stator according to a preferred embodiment of the present invention.

FIG. 6 is a side plan view showing the assembly of a support post of the wire winding device for the stator according to the preferred embodiment of the present invention.

DETAILED DESCRIPTION OF THE PREFERRED EMBODIMENTS

Figure 2:
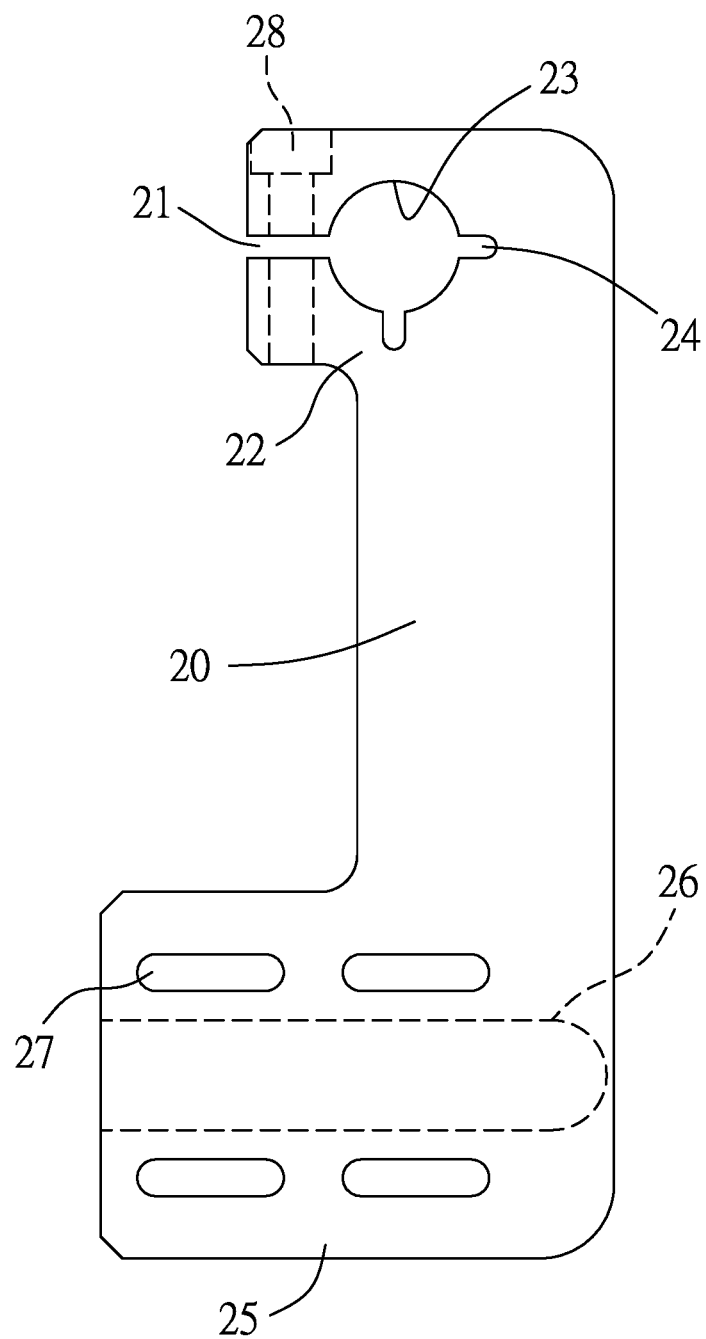
FIG. 2 is a side plan view showing the assembly of a rotatable tray of the wire winding device for the stator according to the preferred embodiment of the present invention.

With reference to FIG. 1, a wire winding device 10 for a stator according to a preferred embodiment of the present invention comprises: a rotatable tray 20, a horizontal shaft 30, a support post 40, and a guiding bar 50.

Figure 3:
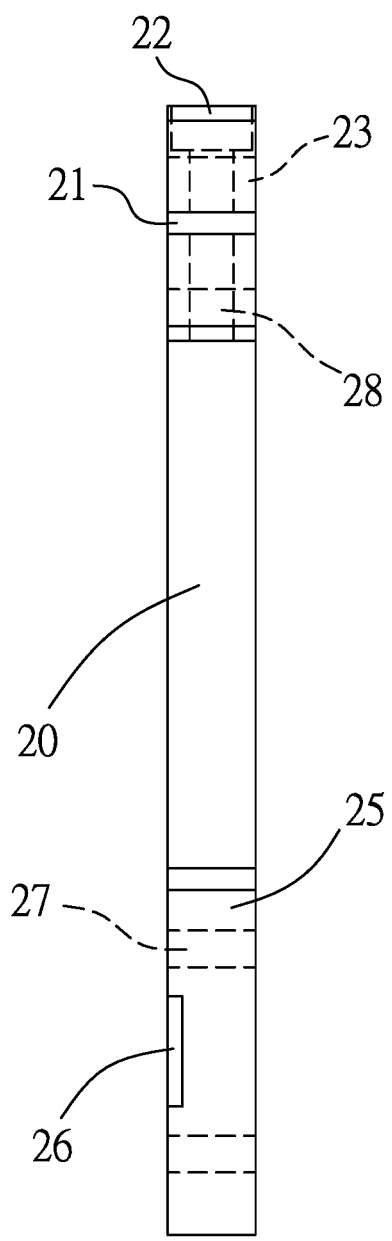
FIG. 3 is another side plan view showing the assembly of the rotatable tray of the wire winding device for the stator according to the preferred embodiment of the present invention.
Figure 4:
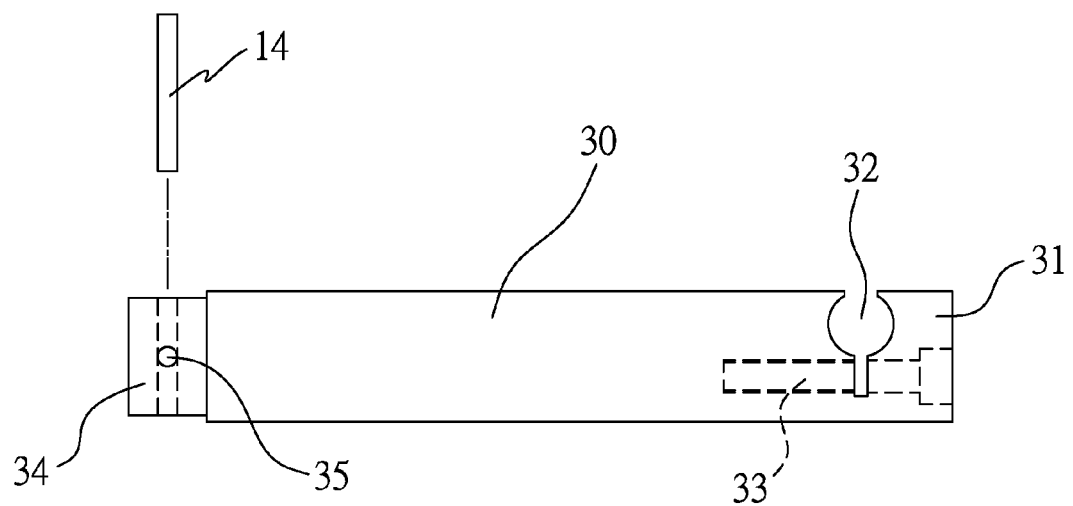
FIG. 4 is a side plan view showing the assembly of a horizontal shaft of the wire winding device for the stator according to the preferred embodiment of the present invention.
Figure 5:
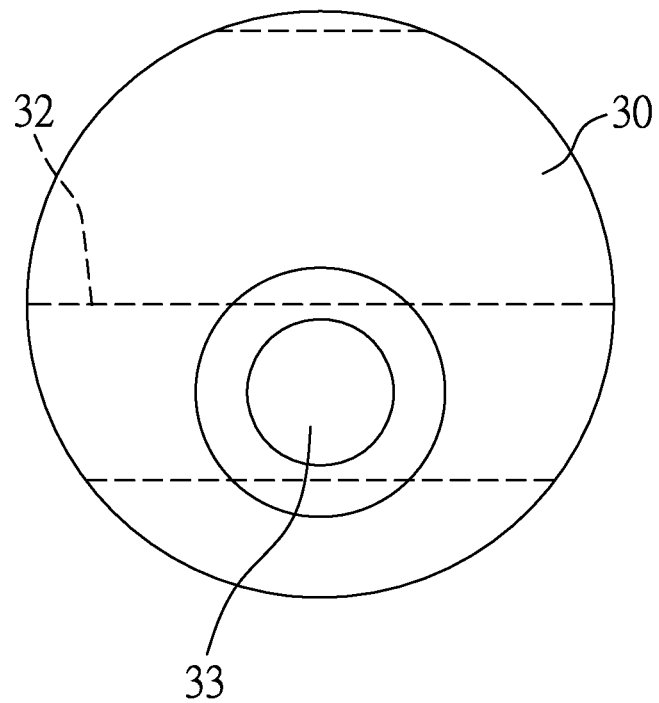
FIG. 5 is another side plan view showing the assembly of the horizontal shaft of the wire winding device for the stator according to the preferred embodiment of the present invention.
Figure 7:
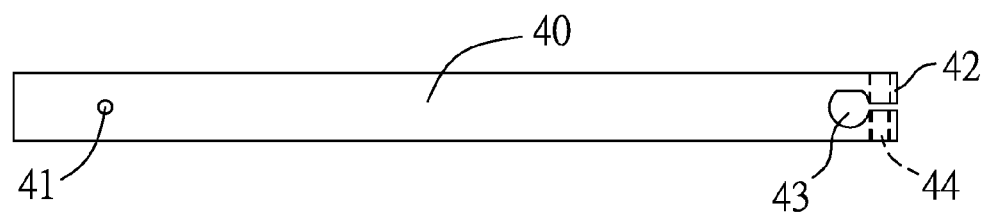
FIG. 7 is another side plan view showing the assembly of the support post of the wire winding device for the stator according to the preferred embodiment of the present invention.

Referring further to FIGS. 1 to 3, the rotatable tray 20 is formed in an L shape and includes a clamping portion 22 arranged on a top thereof, an accommodation orifice 23 defined on a central position of the clamping portion 22, a slot 21 extending from the accommodation orifice 23 to a peripheral side of the rotatable tray 20, and a first screwing orifice 28 defined in the rotatable tray 20 and passing through the slot 21, such that the first screwing orifice 28 screws with a first locking element 16 (such as a screw bolt) so as to reduce a distance of the slot 21 and a diameter of the accommodation orifice 23, thus clamping the connect section 34 of the horizontal shaft 30. The clamping portion 22 has two limiting trenches 24, and each trench 24 forms around a peripheral side of the accommodation orifice 23 away from the slot 21.

The rotatable tray 20 further includes a fixing portion 25 arranged on a bottom thereof, a groove 26 defined in the fixing portion 25, and four elongated holes 27 formed adjacent to the groove 26, wherein the groove 26 is defined in one of two surfaces of the fixing portion 25 and mates with a rotating mechanism 12, and any two opposite elongated holes 27 are arranged adjacent to the groove 26 of the rotatable tray 20, wherein the rotating mechanism 12 is fixed on the rotatable tray 20 by screwing the four elongated holes 27 with four second locking elements 16 (such as screw bolts) respectively.

Figure 8:
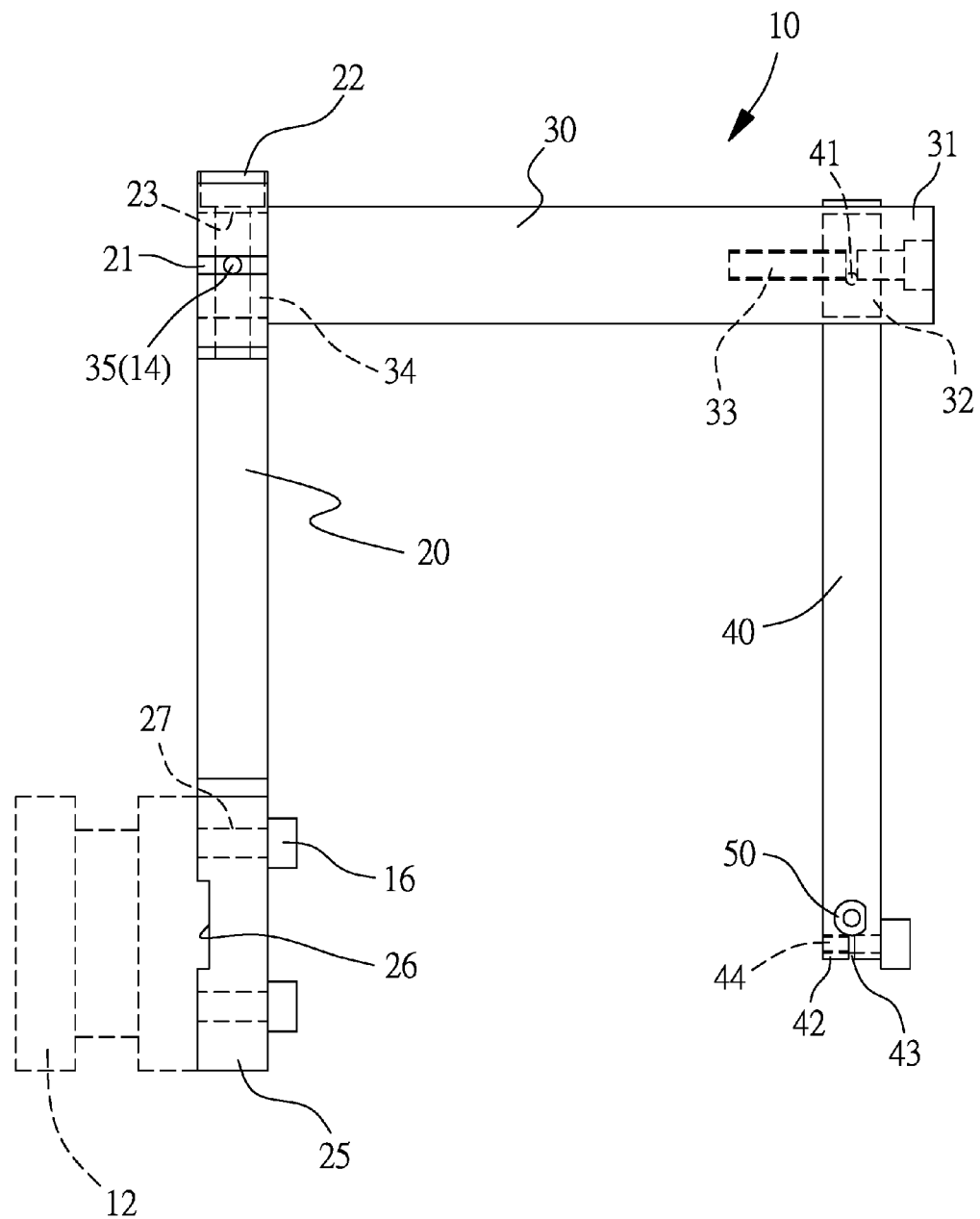
FIG. 8 is a side plan view showing the operation of the wire winding device for the stator according to the preferred embodiment of the present invention.

The rotating mechanism 12 is also mounted on a wire winding machine (not shown) and operates in an automatic control system (not shown) so as to drive the rotatable tray 20 to move upwardly and downwardly or to move reciprocately between a horizontal position of FIG. 1 and a longitudinal position of FIG. 8.

As shown in FIGS. 1, 4, 5 and 8, the horizontal shaft 30 includes a connection section 34 and a clamp arm 31, wherein the connection section 34 is located on a first end of the horizontal shaft 30 and its diameter is less than the horizontal shaft 30. The connection section 34 has two coupling apertures 35 perpendicular to the connection section 34 and passing through a central position of the connection section 34, such that when the connection section 34 inserts into the accommodation orifice 23 of the clamping portion 22, a first joining bolt 14 partially inserts into any one of the two coupling apertures 35, and two second joining bolts 14 insert into the two limiting trenches 24, respectively, so as to stop rotation of the horizontal shaft 30 relative to the rotatable tray 20.

The clamp arm 31 is arranged on a second end of the horizontal shaft 30 proximate to a receiving trough 32, wherein the receiving trough 32 is defined by two semi-circular faces so as to form a clamping space perpendicular to one of the two coupling apertures 35, and the receiving trough 32 is in communication with a second screwing orifice 33 which passes through the clamp arm 31 and extends to the horizontal shaft 30, wherein a third locking element 16 (such as a screw bolt) screws with the second screwing orifice 33 so as to reduce a diameter of the receiving trough 32.

As illustrated in FIGS. 1 and 6 to 8, the support post 40 includes a positioning notch 41, two jaws 42 one piece formed with a first end of the support post 40, a circular cavity 43 defined therein adjacent to the two jaws 42 so as to house a part of the guiding bar 50. Each jaw 42 has a third screwing orifice 44 defined thereon so as to screw with a fourth locking element 16 (such as a screw bolt), thus reducing a distance between the two jaws 42 and clamping the guiding bar 50 tightly.

The positioning notch 41 is formed on a second end of the support post 40 and accommodates a third joining bolt 14. When the support post 40 inserts into the receiving trough 32 of the horizontal shaft 30, the clamp arm 31 clamps the support post 40, and a fourth joining bolt 14 abuts against the receiving trough 32 so as to stop rotation of the support post 40 relative to the horizontal shaft 30.

Preferably, a diameter of the support post 40 is less than the guiding bar 50 so as to drive the guiding bar 52 easily, and the guiding bar 50 is hollow so as to accommodate a metal wire (not shown) which is located in or around the stator.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A wire winding device for a stator comprising: a rotatable tray, a horizontal shaft, a support post, and a guiding bar; wherein
   the rotatable tray includes a clamping portion arranged on a top thereof, a fixing portion arranged on a bottom thereof, an accommodation orifice defined on a central position of the clamping portion, and a slot extending from the accommodation orifice to a peripheral side of the rotatable tray;
   the horizontal shaft includes a connection section located on a first end of the horizontal shaft and inserting into the accommodation orifice of the clamping portion, and the horizontal shaft includes a clamp arm arranged on a second end of the horizontal shaft proximate to a receiving trough;
   the support post inserts into the receiving trough of the horizontal shaft and is clamped by the clamp arm, the support post includes two jaws one piece formed with a first end thereof and includes a circular cavity defined therein adjacent to the two jaws; and
   the guiding bar includes a part housed in the circular cavity and is hollow so as to accommodate a metal wire which is located in or around a stator.

2. The wire winding device for the stator as claimed in claim 1, wherein the rotatable tray further includes a first screwing orifice defined therein and passing through the slot, such that the first screwing orifice screws with a first locking element so as to reduce a distance of the slot and a diameter of the accommodation orifice, thus clamping the connect section of the horizontal shaft.

3. The wire winding device for the stator as claimed in claim 1, wherein the clamping portion has two limiting trenches, and each trench forms around a peripheral side of the accommodation orifice away from the slot; the connection section has two coupling apertures perpendicular to the connection section and passing through a central position of the connection section; when the connection section inserts into the accommodation orifice of the clamping portion, a first joining bolt partially inserts into any one of the two coupling apertures, and two second joining bolts insert into the two limiting trenches, respectively, so as to stop rotation of the horizontal shaft relative to the rotatable tray.

4. The wire winding device for the stator as claimed in claim 1, wherein the support post further includes a positioning notch formed on a second end thereof and accommodates a third joining bolt, wherein when the support post inserts into the receiving trough of the horizontal shaft, and a fourth joining bolt abuts against the receiving trough so as to stop rotation of the support post relative to the horizontal shaft.

* * * * *